United States Patent [19]

Luy

[11] 3,847,013

[45] Nov. 12, 1974

[54] METHOD AND APPARATUS FOR LEAK TESTING OF FILLED-UP AND CLOSED CONTAINERS

[76] Inventor: Hasso Luy, 2359 Henstedt Ulzburg 3, Am Heidberg 18b, Germany

[22] Filed: Oct. 11, 1972

[21] Appl. No.: 296,590

[30] Foreign Application Priority Data
Oct. 14, 1971 Germany.............................. 2151211

[52] U.S. Cl................................. 73/40.7, 73/45.4
[51] Int. Cl. ........................................... G01m 3/16
[58] Field of Search ............ 73/40.7, 41, 45.4, 45.1, 73/45.2, 49.3

[56] References Cited
UNITED STATES PATENTS
2,112,536  3/1938  Krueger .............................. 73/45.2
3,750,458  8/1973  Messervey .......................... 73/45.1

OTHER PUBLICATIONS
"Leak Detectors" of General Electric received in Patent Office Sept. 3, 1958; pages 1–4.

Primary Examiner—Richard C. Queisser
Assistant Examiner—Denis E. Corr
Attorney, Agent, or Firm—Thomas E. Beall, Jr.

[57] ABSTRACT

Filled-up and closed containers, such as aerosol cans, which are to be tested for leaks, are fed one after another each into a separate chamber. The chambers are moving and are hermetically sealed along their path between an inlet and an outlet station. A gas sampling station disposed forwardly of the outlet serves to take a gas sample out of each chamber and feed it to a detector generating a test value signal transmitted, in case of leakage, to a signal storage which in turn is adapted to actuate removal means in response to coding means and on comparison with a threshold means. The discharge means is connected with extinguishing means for said storage means.

12 Claims, 1 Drawing Figure

PATENTED NOV 12 1974  3,847,013
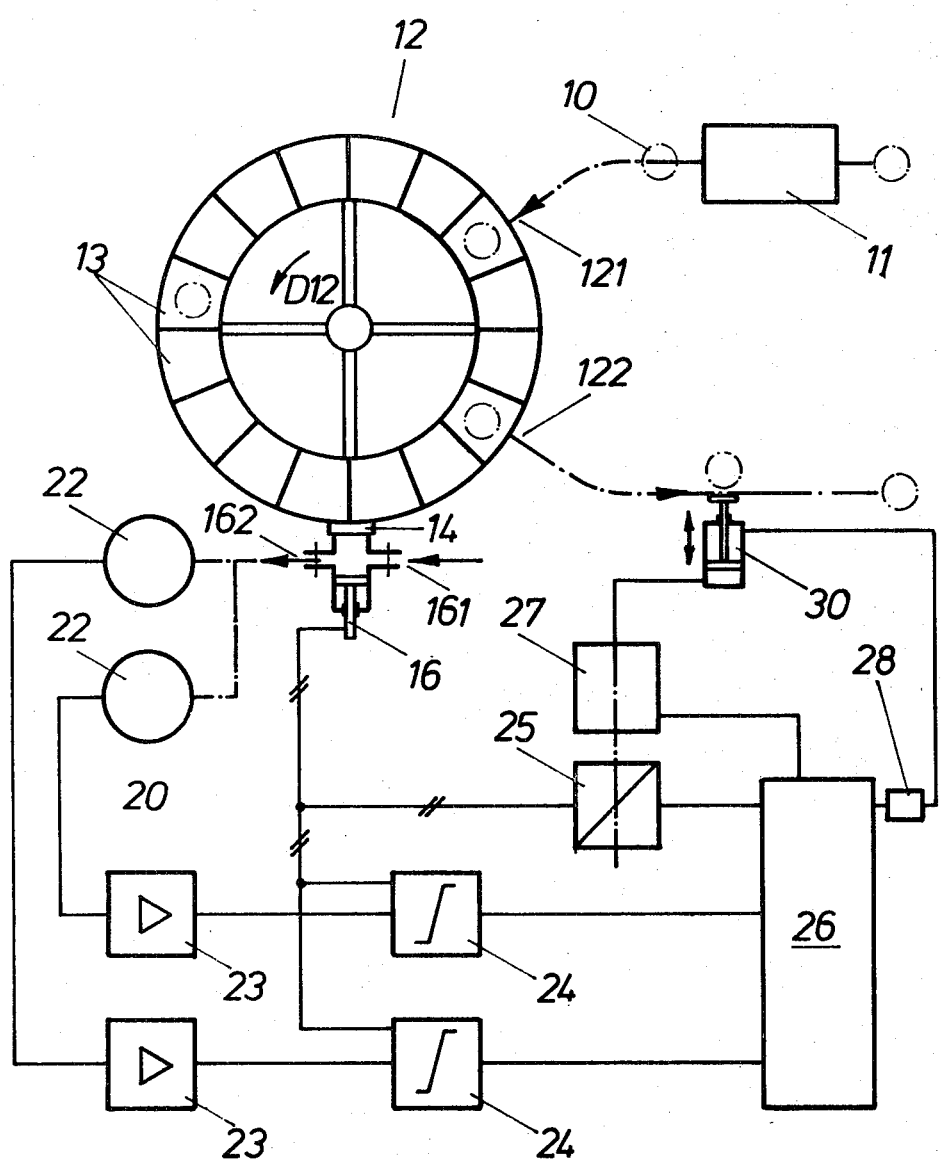

METHOD AND APPARATUS FOR LEAK TESTING OF FILLED-UP AND CLOSED CONTAINERS

BACKGROUND OF THE INVENTION

1. Field of Invention

Containers filled-up with products under overpressure, such as aerosol cans, or the like, must be tested for leaks. As a rule such filled-up pressure-medium containers are to be heated to 50° C whereby the inside pressure, amounting at room temperature to approximately 3 kg/cm$^2$ will be increased to about 7 kg/cm$^2$. In most of the cases the containers are heated to higher temperatures for sorting out leaky containers, since even at room temperature propellent gas may escape through minute leaks, and after a more or less long time there would be no propellent gas left in the container to discharge the effective substance still left therein.

2. Description of the Prior Art

In order to overcome the very complex and time and workmen consuming hitherto used tests in a water bath it is known in testing or examining aerosol cans for leaks to convey the bodies or containers to be tested, extract ambient gas and feed it to a detector means generating a test value signal which, in case of a leak, is transmitted to a storage means and recalled therefrom as soon as the corresponding tested container passes a removal station (see DT-OS 1 923 012). The apparatus for carrying this method into effect comprises a test tunnel with a suction detector through which tunnel the aerosol cans are moved, wherein the containers to be tested are heated by a high frequency coil and the suckedoff ambient gas sample is tested by the detector whith respect to the propellent gas contained therein. The capacity limit of this known method, or the apparatus for carrying it into effect respectively, does not exceed 60 test containers per minute. The detection of the ambiency of the test containers is inexact, since the scavenging of the test space, also below the above mentioned capacity limit, is insufficient, and after the passage of a particularly leaky container a sufficient amount of propellent gas may be present in the test space to indicate a leakage of the next following container to be tested which may in fact be tightly sealed and completely closed, and this will cause a faulty actuation of the removal means. A satisfactory closure of the test space with respect to the ambient atmosphere is not possible. It is also known to test empty containers, serving to be loaded under vacuum, or pressure respectively, by determining a pressure drop in a test chamber into which the containers are introduced with their openings sealed (see U.S. Pat. Nos. 3,135,575 and 3,213,673). With the aid of such device it is not possible to test already filled-up containers completely closed and determine the leakage of gas and besides this they are afflicted with substantial difficulties regarding the seal of the device opening caused particularly by fatigue and wear of the sealing material.

OBJECT OF THE INVENTION

It is an object of this invention to provide a method and an apparatus of testing filled-up and sealed containers, such as aerosol cans, whereby changes of the ambiency of the test bodies (containers) caused by prior tests are avoided, enabling to perform leakage tests with utmost precision independently of any atmospheric ambient influences, and allowing an output at a substantially higher rate then it was hitherto possible.

SUMMARY OF THE INVENTION

The method according to the invention of testing filled-up and closed containers for leaks, particularly aerosol cans containing a propellent gas comprises the following steps:

a. introducing said containers one after another into moving separate chambers;
b. closing said chambers hermetically along a predetermined length of path between an inlet and an outlet station;
c. taking gas samples of predetermined volume successively from each hermetically closed chamber at a predetermined position, while it is moving toward said outlet station;
d. feeding each gas sample to a detector generating a signal;
e. storing said signals in case of leakage;
f. effecting the removal of said respective leaky containers in dependency of the respective signals.

Another feature of the invention provides a method of testing filled-up and closed containers for leaks, particularly aerosol cans containing propellent gas, comprising the following steps:

a. selectively heating said containers;
b. introducing said containers one after another at an inlet station into continuously moving separate chambers;
c. hermetically closing and scavenging said chambers successively with air immediately after a container has entered;
d. moving said containers within said chambers along a predetermined length of path between said inlet station and an outlet station;
e. removing gas samples of predetermined value successively out of each hermetically closed chamber upstream of said outlet station;
f. feeding each sample to a detector generating a signal;
g. storing said respective signals and effecting in case of leakage and surpassing of a threshold value the removal said respective leaky containers;
h. discharging said containers from said chambers at said outlet station and removing said respective leaky containers in dependency of the threshold value and said stored leakage signals;
i. extinguishing the stored signals; and
k. scavenging said empty open chambers successively between said outlet and said inlet stations.

According to these methods it is now assured that the test results of succeeding containers are no longer influenced by the atmosphere created by the preceding containers whereby unobjectionable and reproducable results are obtained for each container to be tested, since a constant reference atmosphere is provided. In addition, by extracting a gas sample of predetermined volume a highly sensible test is achieved allowing to determine the most minute leaks. Besides this an output increase is achieved due to the storage of the test values.

In an apparatus for testing filled-up and closed containers, particularly aerosol cans containing a propellent gas, comprising a test path, in front of which heating means may be arranged if required, said test path having an inlet and an outlet end for said containers to be tested, a detector means connected with a test value storage means, and removal means for tested leaky containers actuated by said test value storage means, the improvement residing in that said test path is formed by a plurality of hermetically closable moving chambers and includes a gas sampling station arranged upstream of the outlet end for said containers to be tested, that said test value storage means is adapted to actuate said removal means by means of a coding means, and that said removal means is connected to extinguishing means for said test value storage means.

In constructing such apparatus according to the invention relatively simple elements are used facilitating the inspection and assuring a safe and reliable operation. Particularly for scavenging or cleaning the individual chambers of remnant gases a sufficient long period is provided, meaning that the chambers, prior to initiating the test of a container to be tested, are always completely filled with fresh air, so that already a very small volume of gas leaking out of a container causes a change of the atmosphere whithin the chamber, which change can be measured. The chambers may be scavenged prior to the entry of a container to be tested as well as after its entry, but also at both instances, whereby it is avoided that unobjectionable containers are influenced by the ambient atmosphere, for example due to adjacently arranged defect containers, or due to an enrichment of the air with propellent gas.

Advantageously said chambers are arranged in form of a rotary table. By this feature a relatively compact space saving apparatus is provided while at the same time sufficiently long paths for the test bodies are obtained, whereby even the smallest leaks may be ascertained, and yet sufficient time is left for thoroughly scavenging the chambers.

According to an advantageous embodiment the invention provides, that said gas sampling station may comprise one or more piston-cylinder units. This arrangement allows an operation with a high output capacity in the order of 90 tested containers per minute and more, since the aspiration of the detectors is greatly assisted. These piston-cylinder units are operating like piston pumps.

In order to obtain a sufficient test capacity the invention provides that said piston-cylinder units are connected via a corresponding number of detector means consisting of sensing means and threshold value detector means with corresponding storage locations in said test value storage means.

Another advantageous feature of the invention is to be seen in that the number of said chambers divided by the number of detector means will result in an integer. This means that always the same chamber will coincide with the same detector and thus with the same storage location in the test value storage means, whereby a longer period for the detector procedure is obtained subsequent to the extraction of the gas sample.

The various objects and advantages of the invention will become more apparent from the following description in connection with the accompanying drawing.

BRIEF DESCRIPTION OF THE DRAWING

The single FIGURE shows schematically the arrangement of the testing apparatus according to the invention.

DESCRIPTION OF THE PREFERRED EMBODIMENT

From the drawing it will be seen that a test path in form of a rotary table 12 is provided for the containers 10 to be tested, such as aerosol cans, the table rotating in the direction indicated by arrow $D_{12}$. This rotary table 12 comprises a plurality of chambers 13 which are hermetically closable, preferably by a steel cover, after a container or test body has been introduced. The containers are fed into the rotary table 12, preferably made of plastic material, at an inlet station 121, after they have passed a heating zone 11.

Spaced in rotating direction from the inlet station 121 a gas extraction station 14 is arranged at the rotary table 12 where a predetermined volume of gas is removed out of each passing chamber 13. This is accomplished by a piston-cylinder arrangement 16 (acting like a piston-pump) provided with an intake or suction connection 161 for the gas inlet and an outlet or blowing connection 162 for the gas outlet. Various constructions and means are conceivable for taking-in and expelling the gas and the air. The gas is removed out of the chambers 13 through openings (not illustrated) provided in the steel cover.

The predetermined gas volume extracted from the chambers 13 is fed via the pump system 16 into a detector means 20 arranged directly adjacent the pump system 16 and comprising substantially a sensor 22, an amplifier 23 and a threshold value detector 24. The pump system 16 and the threshold value detector 24 are interconnected by a coding means 25, e. g. in form of a decoder. These, as well as the threshold value detector 24 are connected with an electronic test value storage means 26. The storage means 26 consists of an arrangement of electronic storage elements, known as flip-flops, in connection with logical construction elements.

The storage means 16 in turn is connected with an encoder 27, a not illustrated photocell and a removal or expelling means 30 by which leaky test bodies are sorted-out. A feedback is provided from the removal means 30 to the storage means 26, where an extinguisher 28 is interconnected for extinguishing the signals in those storage locations which have become free.

The detector means 20 consists substantially of commercial freon detecting devices as commonly used nowadays by refrigerator manufacturers, but suitably the sensors 22 are removed therefrom and arranged directly adjacent the pump system 16 so as to provide the shortest possible path for the gas to be tested and simultaneously the smallest possible dead volume, these features ascertaining a quick and unobjectionable measurement. In employing these devices use is made of the fact that halogenated hydro-carbons are used as propellent gas. However, if other propellent gases are normally used other detectors may be employed. This is merely a question of material. If still greater sensibilities are to be achieved, also ionization detectors, or the like (FJD, ECD etc), may be used, which are also well known in the art. But just as well other detecting methods may be employed, for example spectroscopic photometric measuring methods.

The operation of the device according to the invention is as follows:

After a container 10 to be tested has been heated in the heating station 11 it enters at 121 into a free closable chamber 13 which, upon further movement of the rotary table 12 is immediately hermetically sealed with respect to the atmosphere and is scavenged. Due to the rotation of the rotary table 12 the container 10 remains in the sealed chamber 13, so that in case of a leaky container, the gas concentration in the chamber will increase after the scavenging has been terminated.

Upon passing the gas extraction station 14 a defined volume of gas is extracted from the respective chamber. While prior to this the detector 20, or the sensor 22 respectively, draws in fresh air through the intake connection 161 this will be closed by an electromagnetical impulse emitted from the coding means 25 when a chamber 13 to be tested is approaching, while at the same time other valves provided at the gas removing station are opened, so that now the sensor 22 receives gas out of the chamber 13. Thus, the decoder 25 takes care of the respective opening and closing of the respective valves and spools at the gas removing station 16, whereby the opening into the chamber is opened prior to the suction and closed prior to the discharge (expelling), while at the same time, prior to the discharge, the connection to the detector 20 is opened.

The gas value, i. e. the concentration of the gas extracted from the chamber 13 with respect to the leak gas, is measured in the sensor 22 and transformed into an electrical signal fed via the amplifier 23 to the threshold (limit) value detector 24 which, prior to this, has also been actuated by the coding means 25. At the same time the coding means 25 prepares the test value storage means 26 by selecting and opening a storage element. In case a defined threshold value of the gas concentration is exceeded the corresponding impulse is passed along to the storage means 26. This impuls is stored in the respective storage element until the respective container passes the photocell cooperating via the storage means 26 with the removal means 30. The associated storage element is interrogated and in case of the presence of a positive indication, meaning that a leaky container has been measured, the removal means 30 is actuated and the leaky container 10 removed out of the line. The removal means 30 in turn actuates the extinguishing means 28, whereby the now no longer required storage location is made free for the next operating cycle. The threshold value detectors 24 receiving the electrical test values from the sensors 22 and transforming them into corresponding signals for the storage means 26 are adjustable with respect to their threshold value, whereby the sensibility of the entire apparatus may be adjusted.

The number of chambers 13 provided on the rotary table 12 devided by the number of detectors 20 should result in an integer, in order to assure that always the same chambers remain associated with the same detectors.

In the exemplified embodiment sixteen chambers and two detectors have been provided. However, it is just as well possible to choose eighteen chambers and three detectors, or twenty chambers and four detectors, or any other arrangement.

The cleaning or scavenging of the chambers 13 takes place along the path between the container outlet 122 and the container inlet 121 as well as directly subsequent to the container entry after the chamber has been sealed.

What I claim:

1. The method of testing filled-up and closed containers for leakage of a particular gas, particularly aerosol cans containing propellent gas, comprising the following steps: a) introducing pre-sealed containers with a particular gas under pressure therein one after another at an inlet station respectively into continuously moving separate chambers; b) thereafter hermetically closing and scavenging said chambers successively with a gas other than that to be tested; c) moving said chambers and said containers sealed therein along a predetermined length of path between said inlet station and an outlet station; d) removing gas samples of predetermined volume successively out of each hermetically closed chamber upstream of said outlet station; e) feeding said sample to a detector generating a signal correlated to the quantity of particular gas detected; f) storing at least said signals surpassing a threshold value correlated to respective leaky containers; g) discharging said containers from said chambers at said outlet station; h) thereafter removing only said respective leaky containers in dependency upon the correlated stored signals surpassing the threshold value; i) and thereafter extinguishing the stored signals.

2. The method of claim 1, including the step of selectively heating said containers before gas samples are removed from the chambers therein, to increase the pressure of the gas sealed therein.

3. The method of claim 2, including the step of scavenging said empty open chambers with a gas other than that to be tested between said outlet and said inlet stations.

4. The method of claim 1, including the step of scavenging said empty open chambers with a gas other than that to be tested between said outlet and said inlet stations.

5. Apparatus for testing filled-up and closed containers for leakage of a particular gas, particularly aerosol cans containing propellent gas, comprising: an endless array of separate chambers; means for moving said endless array of separate chambers along a predetermined closed path having an inlet station and a separate spaced outlet station; means for introducing pre-sealed containers with a particular gas under pressure therein one after another at the inlet station respectively into said separate chambers as they move past said inlet station; means for hermetically sealing each of said separate chambers with a container therein between said inlet station and said outlet station; means for removing a predetermined volume of gas successively from each of said sealed chambers upstream of said outlet station; detector means for receiving each of said samples and generating a signal correlated to the quantity of the particular gas detected; means for removing each of said containers from their respective chambers at said outlet station and conveying them along a predetermined discharge path; means for storing at least said signals surpassing a threshold value corresponding to a leaky container for a period of time at least corresponding to the period of time that it takes for the correlated container to move through said outlet station and along said predetermined discharge path a substantial distance; means responsive to said stored signals for ejecting only leaky containers from said discharge path; and means for scavenging said chambers with a gas other than the particular gas to be tested prior to sealing said chambers.

6. The apparatus of claim 5, including means for heating said pre-sealed containers prior to their reaching the position where gas samples are taken from their chamber, to effectively increase the pressure of the particular gas within the containers.

7. The apparatus of claim 6, wherein said detector means produces a signal only in response to the quantity of said particular gas independent of total gas pressure and independent of the presence of air.

8. The apparatus of claim 7, wherein said storage means includes a plurality of separate electrical memory units equal in number to the number of said chambers divided by the number of separate ones of said detector means.

9. The apparatus of claim 8, wherein a plurality of said detector means are provided for respectively receiving successive ones of gas samples from successive chambers.

10. The apparatus of claim 5, wherein said detector means produces a signal only in response to the quantity of said particular gas independent of total gas pressure and independent of the presence of air.

11. The apparatus of claim 5, wherein said storage means includes a plurality of separate electrical memory units equal in number to the number of said chambers divided by the number of separate ones of said detector means.

12. The apparatus of claim 11, wherein a plurality of said detector means are provided for respectively receiving successive ones of gas samples from successive chambers.

* * * * *